United States Patent [19]

Weiss et al.

[11] Patent Number: 5,606,631
[45] Date of Patent: Feb. 25, 1997

[54] METHOD FOR DETECTING AND REMOVING ERRORS EXCEEDING A SPECIFIC CONTRAST IN DIGITAL VIDEO SIGNALS

[75] Inventors: Peter Weiss, Hägersten; Björn Christensson, Bandhagen, both of Sweden

[73] Assignee: DV Sweden AB, Stockholm, Sweden

[21] Appl. No.: 318,733

[22] PCT Filed: Apr. 8, 1993

[86] PCT No.: PCT/SE93/00314

§ 371 Date: Oct. 13, 1994

§ 102(e) Date: Oct. 13, 1994

[87] PCT Pub. No.: WO93/21728

PCT Pub. Date: Oct. 28, 1993

[30] Foreign Application Priority Data

Apr. 13, 1992 [SE] Sweden .................................. 9201182

[51] Int. Cl.⁶ .............................. G06K 9/40; H04N 5/21
[52] U.S. Cl. ........................ 382/275; 382/261; 382/274; 382/107; 348/607; 348/701
[58] Field of Search .................................. 348/616, 619, 348/620, 607, 701; 382/275, 260, 261, 107, 154, 236, 274

[56] References Cited

U.S. PATENT DOCUMENTS

| | | |
|---|---|---|
| 4,305,091 | 12/1981 | Cooper ........................ 358/36 |
| 4,573,070 | 2/1986 | Cooper ........................ 358/36 |
| 4,682,230 | 7/1987 | Perlman et al. ............. 348/616 |
| 4,723,166 | 2/1988 | Stratton ...................... 358/167 |
| 4,825,440 | 4/1989 | Heitmann et al. ............. 371/31 |
| 4,837,624 | 6/1989 | Heitmann et al. ............ 358/166 |
| 4,838,685 | 6/1989 | Martinez et al. ............ 348/701 |
| 4,875,106 | 10/1989 | Heitman ...................... 358/314 |
| 4,924,306 | 5/1990 | van der Meer et al. ...... 348/701 |
| 5,099,329 | 3/1992 | Oyama et al. ................ 348/620 |
| 5,276,512 | 1/1994 | Onda ............................ 348/620 |

Primary Examiner—Leo Boudreau
Assistant Examiner—Bhavesh Mehta
Attorney, Agent, or Firm—Jacobson, Price, Holman & Stern, PLLC

[57] ABSTRACT

A method for detecting and removing errors in pictures associated with a picture sequence in digital video sigals is disclosed. For this purpose an error detector and a filter for continuous processing of pixels associated with said pictures is used. The error detector detects an error if at least one error pixel, being a pixel with a specific contrast, i.e. difference in pixel intensities, is found when comparing the pixel intensities of pixels belonging to at least two pictures in said picture sequence. The error detector determines an error shape, and the filter which is an adaptive filter, replaces the intensity of a current error pixel with a mathematical function of pixel intensities of the current pixel and pixels surrounding the error shape.

12 Claims, 5 Drawing Sheets

5,606,631

METHOD FOR DETECTING AND REMOVING ERRORS EXCEEDING A SPECIFIC CONTRAST IN DIGITAL VIDEO SIGNALS

BACKGROUND OF THE INVENTION

The invention relates generally to a method for detecting and removing errors exceeding a specific contrast in digital video signals. This is achieved by using an error detector and a filter, which continuously process pixels (picture elements) associated with pictures in a picture sequence in said digital video signals.

Digital video signals usually consist of a sequence of pictures, whereat the pictures are made up of pixels of interlaced video fields. The characteristics of such digital video signals are determined by how they were originated, processed, transmitted, etc. Below, a picture will be referred to as a film frame if the original source material is film, whereas a picture will be referred to as a video field if the original source is video. Conversely, the word "picture" will in some cases mean a "field".

Dependent upon the origin, the digital video signals may contain various characteristic high contrast, peak white or peak black errors. More specifically this may refer to the presence of areas with large differences in pixel values, where the areas are adjacent within one picture, or where the areas have corresponding coordinates in different pictures.

Film originated errors, when film has been transferred to video, usually belong to two or three consecutive fields and are usually caused by scratches or dust. Such film originated errors differ from video originated errors, which are normally part of only one field, e.g. video transmission errors caused by FM-threshold noise resulting in a typical one-dimensional pattern when the picture sequence is monitored.

Known methods for detecting and removing errors exceeding a specific contrast in digital video signals include linear and non-linear processing within one picture or between pictures in the picture sequence. These methods usually include an error detection part and a filtering part. There are methods wherein the filtering part is controlled by an external triggering device.

A difficulty in known methods is that the detection is incapable of accurately separating image and error information contained in the video signals, thus giving large side-effects in loss of resolution or distortion, as well as inability to adapt the filtering in real-time according to specific shapes of errors which are to be removed.

SUMMARY OF THE INVENTION

The present invention concerns an improved method for detecting and removing errors exceeding a specific contrast in digital video signals and is specially adapted to handle a wide range of different error shapes in a picture sequence and to give a minimum of side-effects.

One particular problem to be solved by a method according to the present invention is to accurately separate signal and error information and to achieve adaptive filtering according to a current specific error shape. This problem is solved by a method characterized in that the error detector detects an error if at least one error pixel, being a pixel with a specific contrast, i.e. difference in pixel intensities, is found when comparing the pixel intensities of pixels belonging to at least two pictures in said picture sequence, and in that the error detector determines an error shape of a detected error, the error shape being a group of pixels consisting of said error pixel and adjacent pixels with a specific contrast, if any, and in that the filter is an adaptive filter which, when a current pixel is an error pixel, replaces the intensity of the current pixel with an intensity being a mathematical function of pixel intensities of pixels within and outside said error shape, whereas a current pixel that is not an error pixel is bypassed through said adaptive filter. If no pixels with a specific contrast are adjacent to the error pixel, said group of pixels includes the error pixel only.

Suitable further developments of the invention are defined in the dependent claims and will be explained below.

BRIEF DESCRIPTION OF THE DRAWINGS

A preferred embodiment of the invention will be described below with reference to the accompanying drawings, wherein.

DESCRIPTION OF A PREFERRED EMBODIMENT

In a preferred embodiment of the invention the method is based on three-dimensional (including two spatial dimensions and one temporal dimension) processing of pixels associated with a current picture in a picture sequence in digital video signals.

Every such pixel is processed by an error detector to determine whether the pixel is part of an error and, if so, to determine the error shape, i.e. a group of pixels, associated with the error. If the pixel is part of an error, the error shape is used by an adaptive filter for replacing the pixel with a mathematical median value of pixels associated with said current picture as well as pixels associated with at least one preceding picture and at least one following picture in the picture sequence.

Figure 1:
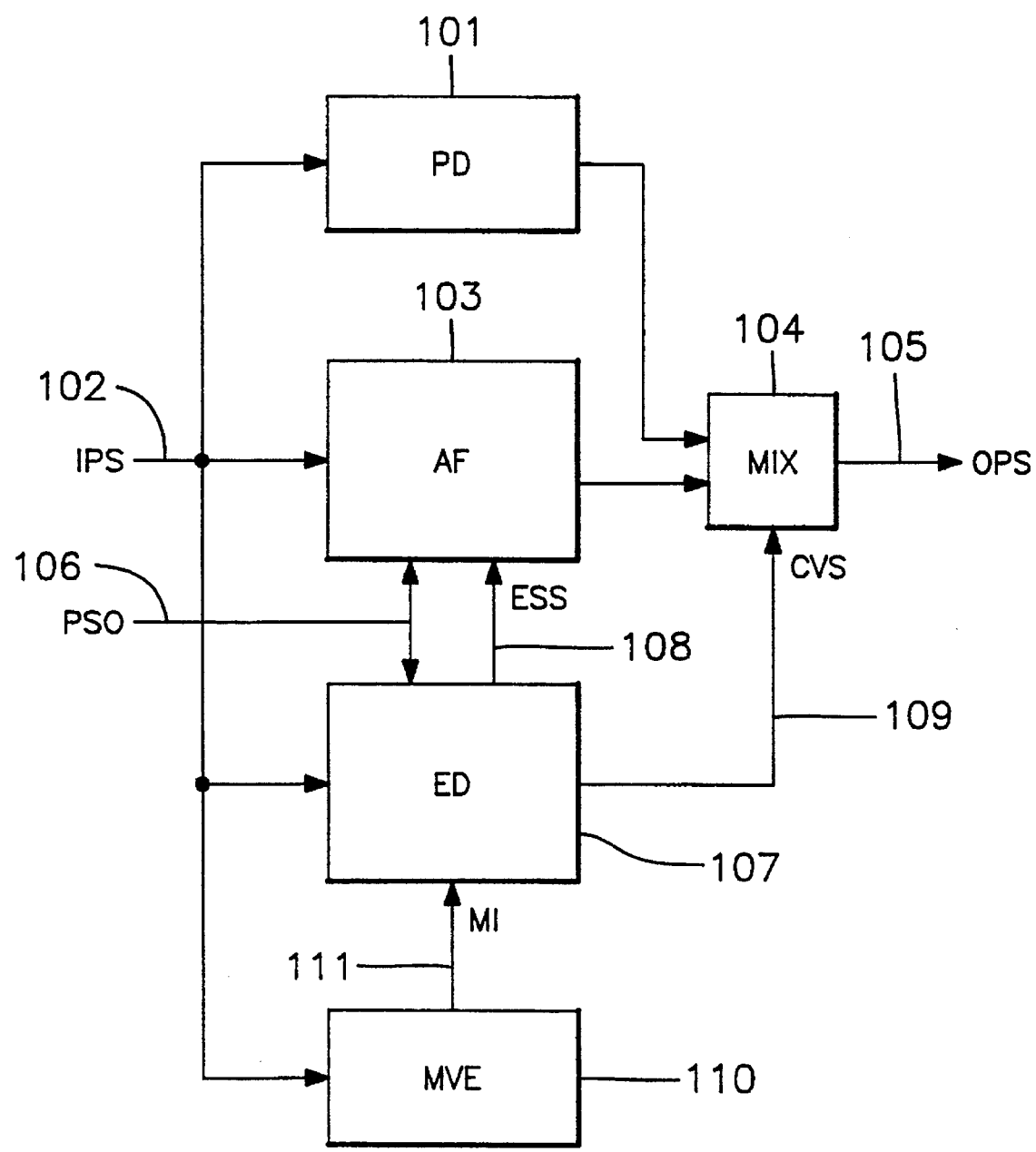
FIG. 1 shows a block diagram illustrating the principal functions of a method according to the invention. The block diagram schematically shows a picture sequence input to an error detector, an adaptive filter, a motion vector estimator, and a picture delay. Arrows mark the flow of various picture information. A mixing unit is shown, which outputs a processed picture sequence.

With reference to FIG. 1 the principal functions of the method will be described. A picture sequence 102 is input to an error detector 107, an adaptive filter 103, a motion vector estimator 110, and a picture delay 101.

The error detector 107 calculates inter-picture pixel contrasts and inter-picture activity. It may also make use of motion information 111 from the motion vector estimator 110. The error detector 107 detects an error if a pixel is found, which has at least a predetermined inter-picture contrast value and is not assumed to be part of a global or local movement in the picture sequence. The error detector 107 also determines a shape of a detected error, the shape being one single pixel or a group of immediately adjacent pixels which have at least a predetermined inter-picture contrast value and are not assumed to be part of a global or local movement in the picture sequence.

An error shape signal 108 is output by the error detector 107 to the adaptive filter 103. If no error is detected, the output error shape signal 108 will indicate an error shape containing no pixels. When an error is detected the adaptive filter 103 replaces the intensity of a current pixel belonging to the error with an intensity being a mathematical function of pixel intensities of the current pixel and pixels surrounding the current pixel. The adaptive filter output is then fed to a mixing unit of 104. The motion information 111 may also be used in the adaptive filter 103 (no connection shown in FIG. 1) for compensating for inter-picture movement.

Further, the error detector 107 calculates a confidence value signal 109 corresponding to the likelihood that a current pixel has been correctly detected as an error pixel, the calculation of the likelihood being based on the difference matrices, including the inter-picture contrast matrices, the inter picture-activity measurement and, possibly, also the motion information 111. The confidence value is used for controlling a mixing of unfiltered pixels, delayed by the picture delay 101 and pixels output by the adaptive filter 103. The mixing is carried out in the mixing unit 104, which outputs a filtered picture sequence in which high contrast errors have been removed. If an error is detected, the inter-picture activity matrix and/or the motion information affect the confidence value, in such a way, that the influence of the adaptive filter output exerted on the filtered picture sequence 105 from the mixing unit 104, is inversely proportional to the inter-picture activity and/or motion contents of the matrices.

Preferably, a picture sequence origin signal 106, indicating the video fields corresponding to a picture in the picture sequence, e.g., film or video, 50 or 60 Hz standard, is input to the error detector 107 and to the adaptive filter 103 for the purpose of adapting detection and filtering according to characteristics of errors and to the order of pixels, associated with a certain picture in the digital video signals.

Figure 2:
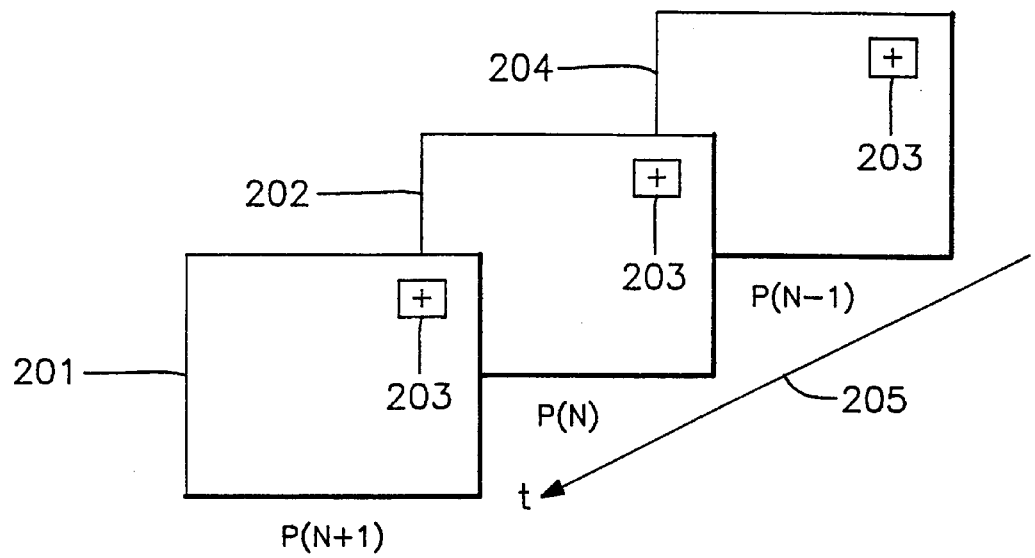
FIG. 2 shows three consecutive pictures of an input picture sequence, wherein an analyzing window is shown. The time separation of the pictures is illustrated by a time axis.

With reference to FIG. 2 the use of an analyzing window 203 will be described. When processing a current pixel, areas in three consecutive pictures 201, 202, 204 in the picture sequence are compared. The three consecutive pictures 201, 202, 204 are separated in time as shown by a time axis 205. The area is referred to as the analyzing window 203, which is centered around the position of the current pixel, the coordinate of which is marked with a cross in three consecutive pictures 201, 202, 204 in the picture sequence. The pixels, within the analyzing window 203 in the three consecutive pictures 201, 202, 204, are used to calculate three difference matrices 206, 207, 210 (FIG. 3) containing pixel contrasts, i.e. difference in pixel intensity. Two motion matrices 208, 209 (FIG. 2b) containing motion information, also associated with the analyzing window 203, are provided by the above-mentioned motion vector estimator 110 (FIG. 1).

Figure 3:
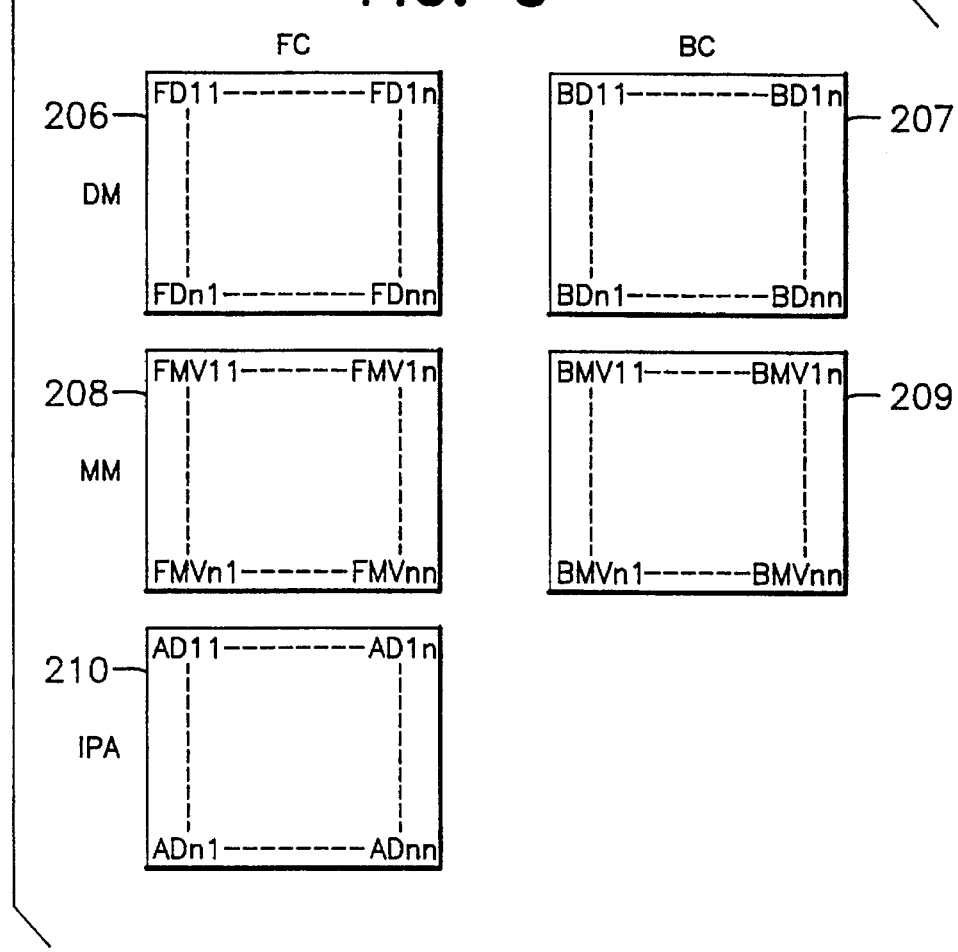
FIG. 3 shows three difference matrices containing pixel contrasts, i.e. difference in pixel intensity, one matrix of which contains inter-picture activity, and two motion matrices containing motion information, all associated with pixels within the analyzing window of the three consecutive pictures.

With reference to FIG. 3 the use of the three difference matrices 206, 207, 210 and the two motion matrices 208, 209 in the error detector will be described. The three difference matrices 206, 207, 210 are calculated to contain pixel contrasts, i.e. differences in pixel intensity, associated with pixels within the analyzing window of the three consecutive pictures. The two motion matrices 208, 209 are calculated to contain motion information, associated with pixels within the analyzing window of the three consecutive pictures. In the difference matrices 206, 207, immediately adjacent pixels giving forward differences (FD11, . . . , FDnn) and backward differences (BD11, . . . , BDnn), which exceed a predetermined level and have the same sign in both the difference matrices 206, 207, correspond to the error shape. In the third difference matrix 210 the pixel contrasts between pictures P(N+1) and P(N–1) are calculated, which correspond to the inter-picture activity represented by activity differences (AD11, . . ., ADnn).

The error detector may also use motion information, supplied by the motion vector estimator 110 (see, e.g, PCT/SE92/00219). The motion information is represented by forward motion vectors (FMV11, . . . , FMVnn) and backward motion vectors (BMV11, . . . , BMVnn) in the two motion matrices 208, 209. The motion vectors are used by the error detector in order to improve error detection accuracy, in such a way that pixels, which are part of true global or local movement in the picture sequence, are not detected as errors.

Figure 4:
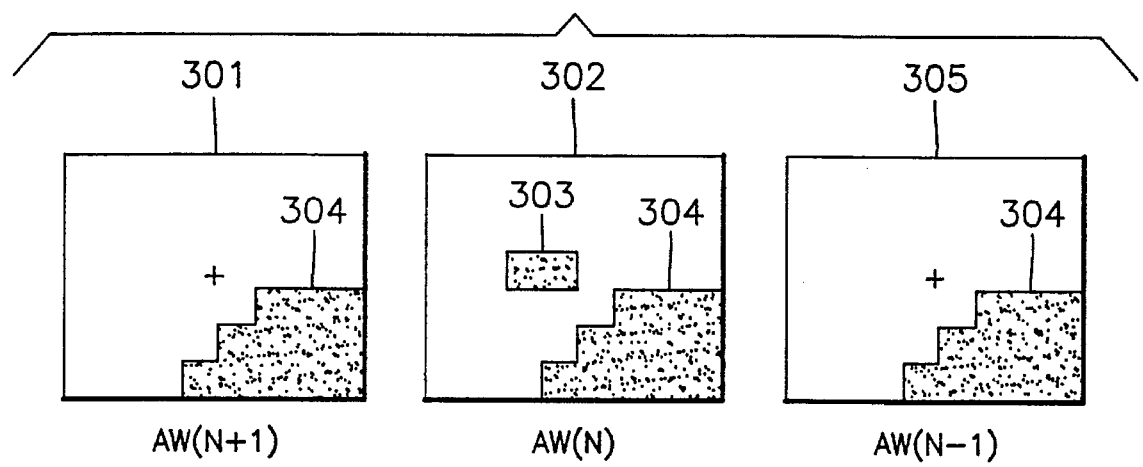
FIG. 4 shows the analyzing window in three consecutive pictures of an input picture sequence containing no motion. In the middle consecutive picture an error is shown.
Figure 5:
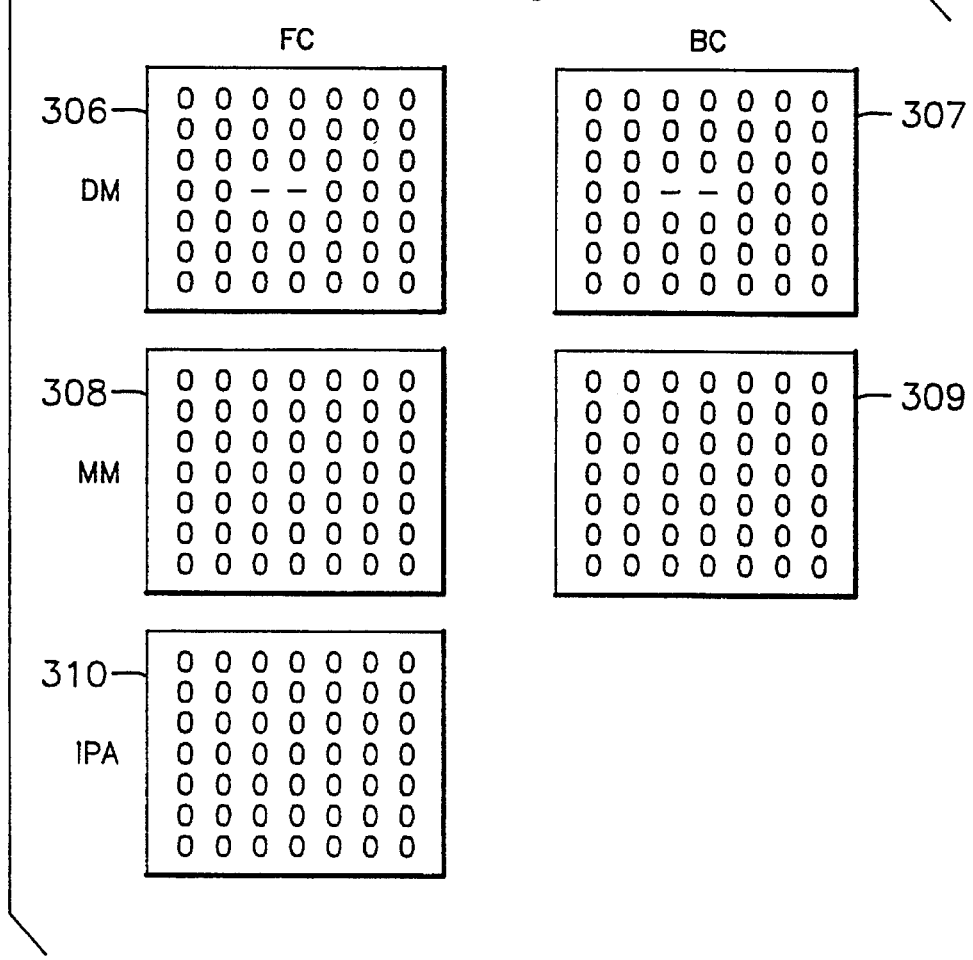
FIG. 5 shows the three difference matrices containing pixel contrasts, one matrix of which contains inter-picture activity, and two motion matrices containing motion information, all associated with pixels within the analyzing window of the three consecutive pictures containing no motion.

With reference to FIGS. 4 and 5 an example of the use of an analyzing window 301, 302, 305 in the error detector will be described. Shown within the analyzing window 301, 302, 305, in three consecutive pictures, are a non-moving object 304 and an error 303. The error detector calculates the three difference matrices 306, 307, 310 and the two motion matrices 308, 309, in which the results are shown symbolically, with zeros for no intensity difference, zeros for no inter-picture activity, zeros for no motion, and minus signs for negative intensity differences.

Figure 6:
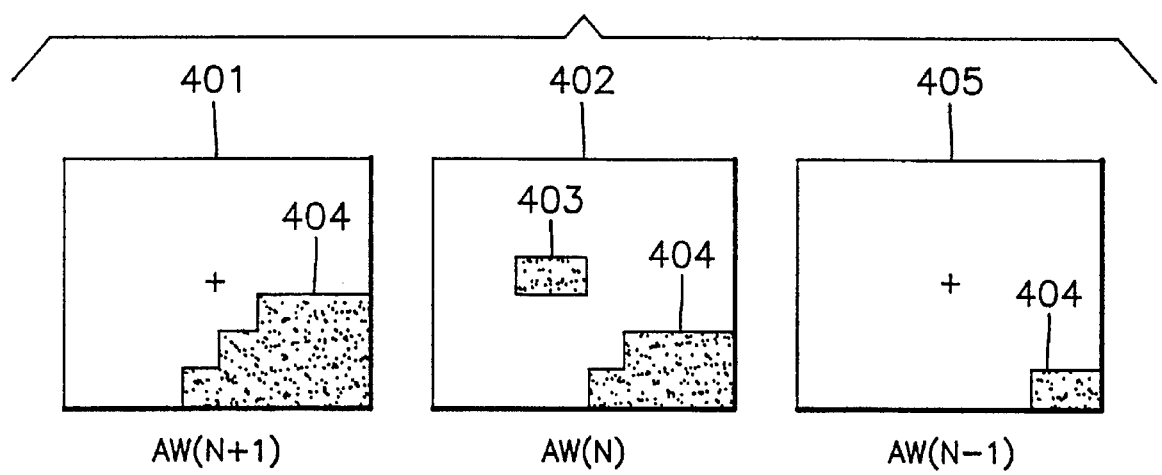
FIG. 6 shows the analyzing window in three consecutive pictures of an input picture sequence containing motion. In the middle consecutive picture an error is shown.
Figure 7:
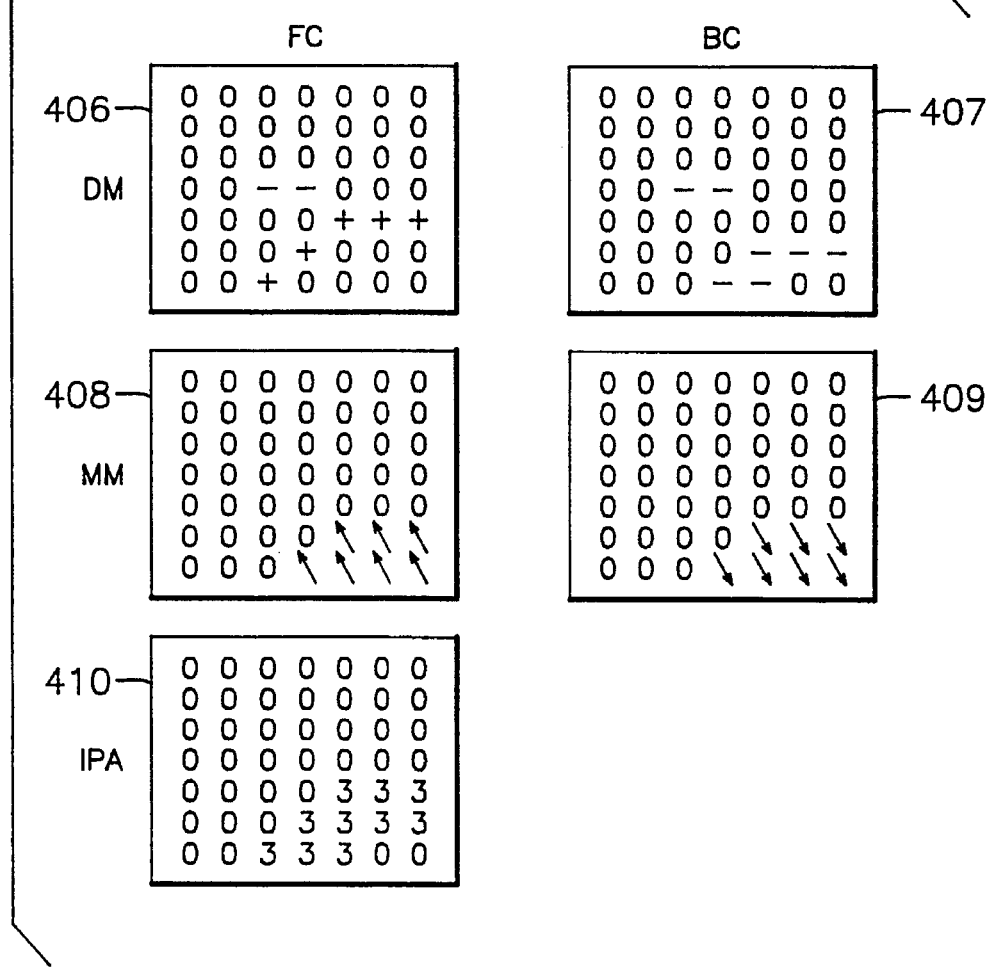
FIG. 7 shows the three difference matrices containing pixel contrasts, one matrix of Which contains inter-picture activity, and two motion matrices containing motion information, all associated with pixels within the analyzing window of the three consecutive pictures containing motion.

With reference to FIGS. 6 and 7 another example of the use of the analyzing window 401, 402, 405 in the error detector will now be described. Shown within the analyzing window 401, 402, 405, in three consecutive pictures, are a moving object 404 and an error 403. The error detector calculates the three difference matrices 406, 407, 410 and the two motion matrices 408, 409, in which the results are shown symbolically, with zeros for no intensity difference, zeros for no inter-picture activity, a numerical value indicating the inter-picture activity, zeros for no motion, arrows for motion vectors, plus signs for positive intensity differences, and minus signs for negative intensity differences.

Figure 8:
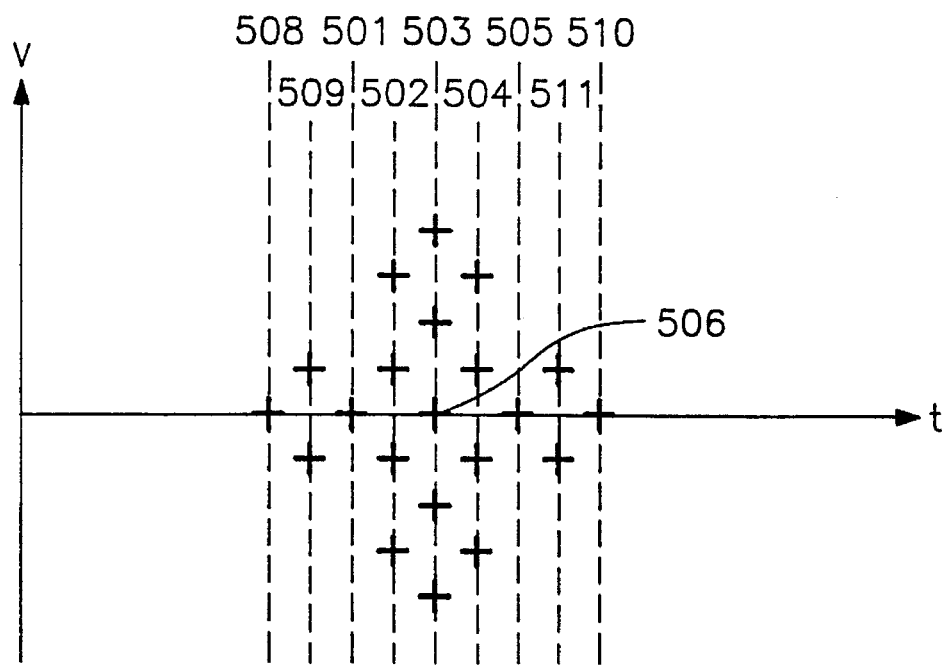
FIG. 8 shows a diagram over time and the vertical field dimension, wherein crosses represent pixels of fields making up pictures in digital video signals. The pixel to be processed is marked in the diagram.
Figure 9:
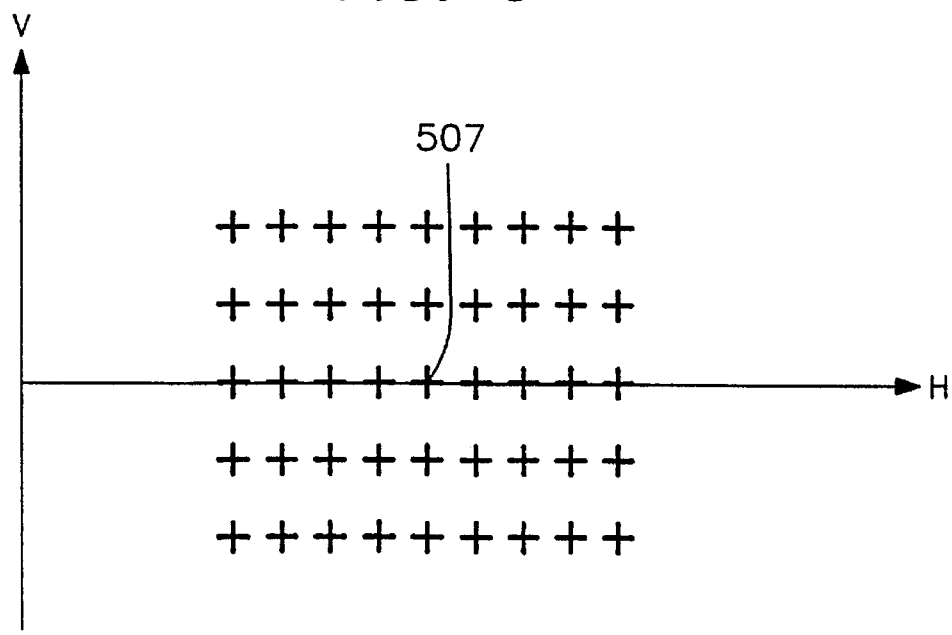
FIG. 9 shows a diagram over vertical and horizontal field dimensions, wherein crosses represent pixels of one field. The pixel to be processed is marked in the diagram.

With reference to FIGS. 8 and 9 pixels accessible to the adaptive-filter in the preferred embodiment will be described. Shown diagrams illustrating vertical, horizontal and time dimensions, contain crosses representing accessible pixels. The pictures of digital video signals are made up of interlaced fields, two fields representing a TV frame. FIG. 8 shows pixels associated with the same field 503 as the pixel 506, which is currently being processed, as well as pixels associated with surrounding fields 501, 502, 504, 505, 508, 509, 510, 511. FIG. 9 shows pixels associated with the same field as a pixel 507, which is currently being processed.

The origin of the picture sequence determines the particular field or fields, in the digital video signals, to which pixels associated with a certain picture belong. According to this and the error shape supplied by the error detector, the adaptive filter uses a sub-set of the pixels, shown in FIGS. 8 and 9, when filtering the current pixel 506, 507.

Although the invention has been described in conjunction with a preferred embodiment, it is to be understood that various modifications may be made without departing from the spirit and scope of the invention as defined by the appended claims.

We claim:

1. A method for detecting and removing errors in pictures associated with a picture sequence in digital video signals, by using an error detector and an adaptive filter for continuous processing of pixels associated with said pictures, said method comprising the steps of:

comparing pixel intensities of corresponding pixels belonging to at least two of said pictures, using said error detector;

detecting, using said error detector, whether there is an error in one of said pictures, by determining whether there is a specific contrast, i.e. difference in pixel intensities, between corresponding pixels in said at least two pictures in said picture sequence;

determining, using said error detector, an error shape defined by a continuous picture domain wherein every pixel belonging to said continuous picture domain exhibits at least said specific contrast;

replacing, via said adaptive filter, an intensity of each pixel within said error shape with an intensity that is a mathematical function of pixel intensities of pixels within and outside said error shape; and bypassing through said adaptive filter any pixels that are not included in said error shape.

2. The method as defined in claim 1, wherein said error detector performs said steps of comparing, determining, and detecting using an analyzing window centered around a current pixel, in three consecutive pictures in said picture sequence.

3. The method as defined in claim 2, wherein said error detector, for said analyzing window, calculates two differences matrices indicative of differences in pixel intensities for a current picture in relation to corresponding pixels in a previous picture and in relation to corresponding pixels in a following picture of said three consecutive pictures, wherein corresponding pixels giving differences, which exceed a predetermined level and have like signs in both said difference matrices, are designated as being within said error shape.

4. The method as defined in claim 2, wherein said error detector for said analyzing window, calculates a difference matrix indicative of inter-picture activity which is used in order to improve error detection accuracy.

5. The method as defined in claim 2, wherein said error detector also uses motion information belonging to said analyzing window in said pictures in order to improve error detection accuracy, said motion information being supplied by a motion vector estimator.

6. The method as defined in claim 2, wherein pixels surrounding a current pixel, are distributed isotropically, i.e. in all three dimensions, relatively to said current pixel.

7. The method as defined in claim 1, wherein said error detector also uses motion information about said pictures in order to improve error detection accuracy, said motion information being supplied by a motion vector estimator.

8. The method as defined in claim 1, wherein an origin of said picture sequence determines expected characteristics of errors as well as in what order pixels associated with three consecutive pictures are located in said digital video signals, and wherein information indicative of said origin is input to said error detector and to said adaptive filter for the purpose of selecting which pixels to include in said steps of comparing, detecting, determining, replacing and bypassing, respectively.

9. The method as defined in claim 1, wherein said mathematical function is a mathematical median value of pixel intensities, which pixel intensities are taken from a set of pixels of which a greater number of pixels are located outside said error shape than within said error shape.

10. The method defined in claim 1, and further comprising the step of calculating, using said error detector, a confidence value corresponding to the likelihood that a current pixel has been correctly detected as an error, the calculation of said confidence value being based on intensity difference matrices and motion information, if any, wherein said confidence value is used for controlling a mixing of each pixel within said error shape with bypassed pixels that are not included in said error shape.

11. The method defined in claim 1, wherein said continuous picture domain is defined by:

one erroneous pixel if said one erroneous pixel has no other erroneous pixels immediately adjacent thereto exhibiting at least said specific contrast; and multiple erroneous pixels, if each of said multiple erroneous pixels exhibits at least the specific contrast and said multiple erroneous pixels are located immediately adjacent to one another.

12. A method for detecting and removing errors in pictures associated with a picture sequence in digital video signals, by using an error detector and a filter for continuous processing of pixels associated with said pictures, characterized in that said error detector detects an error if at least one error pixel, being a pixel with a specific contrast, i.e. difference in pixel intensities, is found when comparing the pixel intensities of pixels belonging to at least two pictures in said picture sequence, and in that said error detector determines an error shape of a detected error, said error shape being a group of pixels consisting of said error pixel and adjacent pixels with a specific contrast, if any, and in that said filter is an adaptive filter which, when a current pixel is an error pixel, replaces the intensity of said current pixel with an intensity being a mathematical function of pixel intensities of pixels within and outside said error shape, whereas a current pixel that is not an error pixel is bypassed through said adaptive filter, wherein said error detector calculates a confidence value corresponding to the likelihood that a current pixel has been correctly detected as an error pixel, the calculation of said confidence value being based on difference matrices and motion information, if any, wherein said confidence value is used for controlling a mixing of unprocessed pixels and pixels resulting from said continuous processing.

* * * * *